US005531107A

United States Patent [19]
Ganzhorn, Jr.

[11] Patent Number: 5,531,107
[45] Date of Patent: Jul. 2, 1996

[54] METHOD AND APPARATUS FOR ESTABLISHING VIRTUAL INERTIA IN A CHASSIS DYNAMOMETER

[75] Inventor: Donald W. Ganzhorn, Jr., Solon, Ohio

[73] Assignee: Ganzcorp Investments, Inc., Twinsburg, Ohio

[21] Appl. No.: 388,803

[22] Filed: Feb. 15, 1995

[51] Int. Cl.$^6$ .......................................................... G01L 3/22
[52] U.S. Cl. ............................................................... 73/117
[58] Field of Search ..................................... 73/117.1, 117, 73/116, 862.09, 862.17, 862.191; 324/207.15, 207.25

[56] References Cited

U.S. PATENT DOCUMENTS

| | | |
|---|---|---|
| 2,882,721 | 4/1959 | Harned et al. . |
| 3,767,195 | 10/1973 | Dimick . |
| 3,827,292 | 8/1974 | Zelson . |
| 3,832,894 | 9/1974 | Pelta . |
| 3,855,852 | 12/1974 | Cline ............................................ 73/117 |
| 3,978,718 | 9/1976 | Schorsch ................................. 73/117.3 |
| 4,161,116 | 7/1979 | Fegraus et al. . |
| 4,186,593 | 2/1980 | Watanabe . |
| 4,257,261 | 3/1981 | Ono et al. . |
| 4,327,578 | 5/1982 | D'Angelo . |
| 4,382,388 | 5/1983 | Ono . |
| 4,442,708 | 4/1984 | Gable et al. . |
| 4,576,051 | 3/1986 | Lautenschlager ..................... 73/862.17 |
| 4,656,576 | 4/1987 | Kawarabayashi . |
| 4,680,959 | 7/1987 | Henry et al. . |
| 4,745,799 | 5/1988 | Kawarabayashi et al. ................ 73/117 |
| 4,758,967 | 7/1988 | Shmuter et al. . |
| 5,078,008 | 1/1992 | Yagi et al. ................................. 73/117 |
| 5,101,660 | 4/1992 | LaBelle . |
| 5,154,076 | 10/1992 | Wilson et al. . |
| 5,193,062 | 3/1993 | Murase et al. . |
| 5,195,038 | 3/1993 | Yagi et al. . |
| 5,375,460 | 12/1994 | LaBelle ...................................... 73/117 |
| 5,385,042 | 1/1995 | LaBelle ...................................... 73/117 |

Primary Examiner—Richard Chilcot
Assistant Examiner—George M. Dombroske
Attorney, Agent, or Firm—Tarolli, Sundheim, Covell, Tummino & Szabo

[57] ABSTRACT

A vehicle dynamometer system having at least one roller mounted in a frame for engagement with at least one driven wheel of a vehicle includes an eddy current brake for, when actuated, applying a controllable amount of force to the dynamometer roller. A display displays a graph of desired velocity values versus time graph. Vehicle speed is monitored. A controller comparatively displays on the display the monitored vehicle speed against the desired velocity value and controls the eddy current brake to simulate inertia loads in accordance with the displayed desired velocity values.

17 Claims, 3 Drawing Sheets

METHOD AND APPARATUS FOR ESTABLISHING VIRTUAL INERTIA IN A CHASSIS DYNAMOMETER

TECHNICAL FIELD

The present invention is directed to a method and apparatus for controlling a chassis dynamometer and is particularly directed to a method and apparatus for simulating inertia loads to establish virtual inertia for a vehicle on a chassis dynamometer.

BACKGROUND OF THE INVENTION

Chassis dynamometers for use in testing vehicles are well known in the art. Such dynamometers are particularly useful for emissions testing of motor vehicles to dynamically load the vehicle engine through the vehicle drive train. Emission testing dynamometer systems attempt to simulated road load forces and vehicle inertia forces that would normally act on a vehicle. Typically, dynamometers have at least one large flywheel attached to the dynamometer's rollers to simulate inertia of the vehicle. Since vehicle inertia is a function of the vehicle weight, a flywheel can not accurately simulate vehicle inertia where the dynamometer is used for several different types and weights of vehicles. Also, the flywheel is a fixed inertia device that can not simulate speed dependant variable load forces that result from windage and friction.

Electronically controlled dynamometer systems have been proposed that attempt to simulate vehicle inertia and road loads. These known systems have not, however, provided a real time inertia simulation in a manner that anticipates loading requirements so that loads are applied simultaneously with changes in vehicle speed. Typically, electronically controlled dynamometer systems apply a load only in response to a measured vehicle parameter such as vehicle speed. Therefore, the load is applied late thereby loading the vehicle engine after the engine has accelerated the vehicle wheels.

SUMMARY OF THE INVENTION

The present invention is directed to a method and apparatus for establishing virtual inertia in a chassis dynamometer by anticipating test vehicle speed changes. Virtual inertia, in accordance with the present invention, is established by summing track road load force, general tire rolling interface losses, parasitic loss force, inertia simulation force, and other forces applied by the dynamometer. The track road load force, the parasitic loss force, and the general tire rolling interface losses are responsive to measured vehicle speed. The inertia simulation force is responsive to stored values of vehicle velocity as a function of time so as to anticipate vehicle acceleration.

In accordance with one embodiment of the present invention, an apparatus is provided for establishing virtual inertia in a dynamometer. The apparatus comprises actuatable force producing means for, when actuated, applying a controllable amount of force to a device under test. A display means displays desired velocity values versus time graph. Means are provided for monitoring velocity of the device under test. Control means comparatively displays on the display means the monitored velocity of the device under test against the desired velocity value. The control means also controls the actuatable force producing means to simulate inertia loads in accordance with the displayed desired velocity values.

In accordance with another embodiment of the present invention, an apparatus is provided for establishing virtual inertia in a dynamometer having at least one roller mounted in a frame for engagement with at least one driven wheel of a vehicle. The apparatus comprises actuatable force producing means for, when actuated, applying a controllable amount of force to the at least one roller of the dynamometer. Display means displays a desired velocity values versus time graph. Means are provided for monitoring vehicle speed. Control means comparatively displays on the display means the monitored vehicle speed against the desired velocity values and controls the actuatable force producing means to simulate inertia loads in accordance with said displayed desired velocity values.

In accordance with another embodiment of the present invention, a method is provided for establishing virtual inertia in a dynamometer. The method comprises the steps of applying a controllable amount of force to a device under test in response to a control signal, displaying a desired velocity values versus time graph for the device under test, monitoring actual velocity of the device under test, and comparatively displaying the monitored velocity of the device under test against the desired velocity value of the device under test. The method further comprises the step of providing the control signal to control the applied force and thereby simulate inertia loads in accordance with the displayed desired velocity values of the device under test.

In accordance with yet another embodiment of the present invention, a method for establishing virtual inertia in a dynamometer having at least one roller mounted in a frame for engagement with at least one driven wheel of a vehicle, includes the steps of applying a controllable amount of force to the at least one roller of the dynamometer in response to a control signal, displaying a desired velocity values versus time graph, monitoring vehicle speed, comparatively displaying the monitored vehicle speed against the desired velocity value, and providing the control signal to control the applied force and thereby simulate inertia loads in accordance with the displayed desired velocity values.

BRIEF DESCRIPTION OF THE DRAWINGS

The foregoing and other features and advantages of the present invention will become apparent to one skilled in the art to which the present invention relates upon consideration of the following description of the invention with reference to the accompanying drawings, wherein.

DESCRIPTION OF PREFERRED EMBODIMENT

Figure 1:
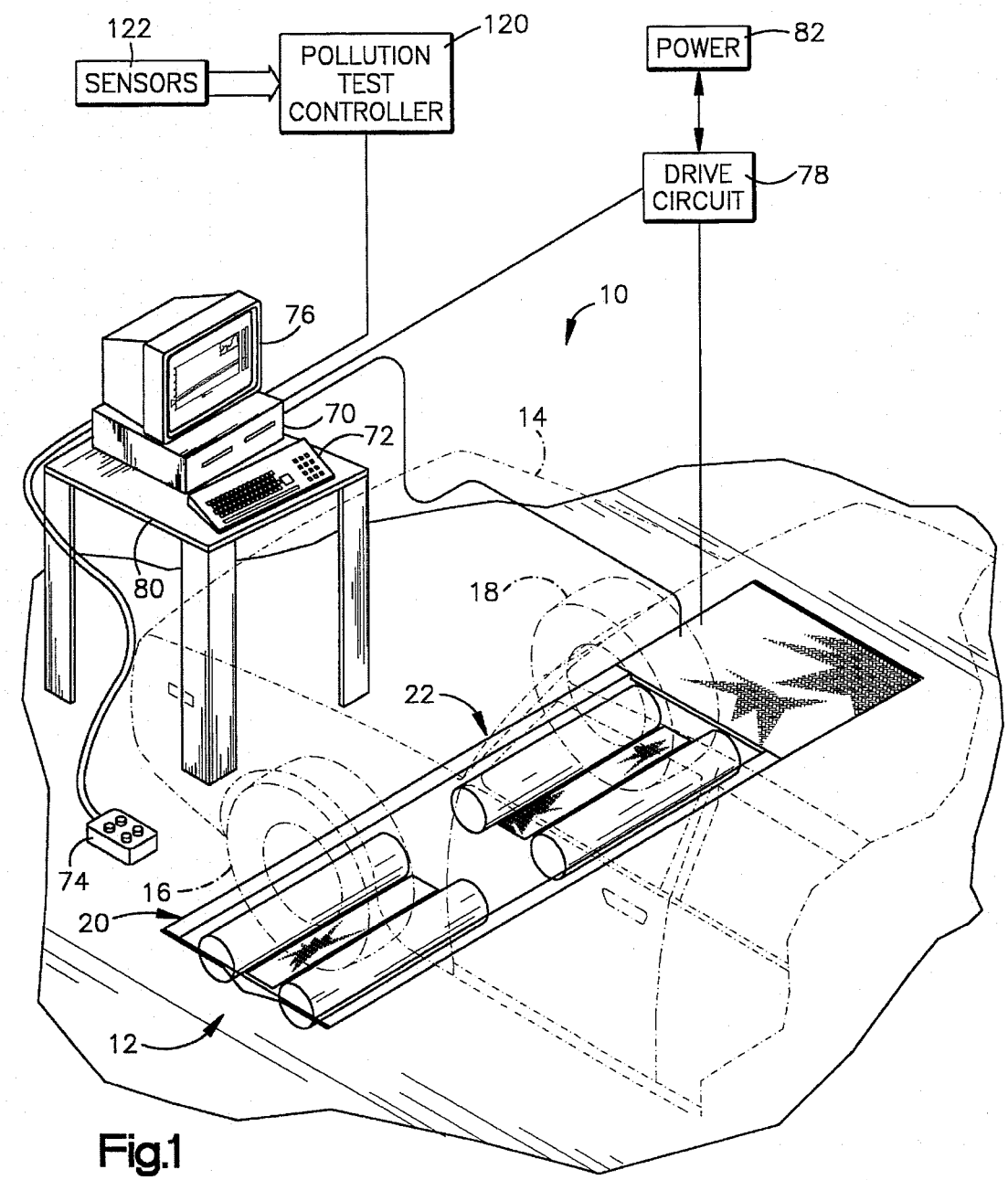
FIG. 1 is a schematic diagram of a dynamometer system made in accordance with the present invention.
Figure 2:
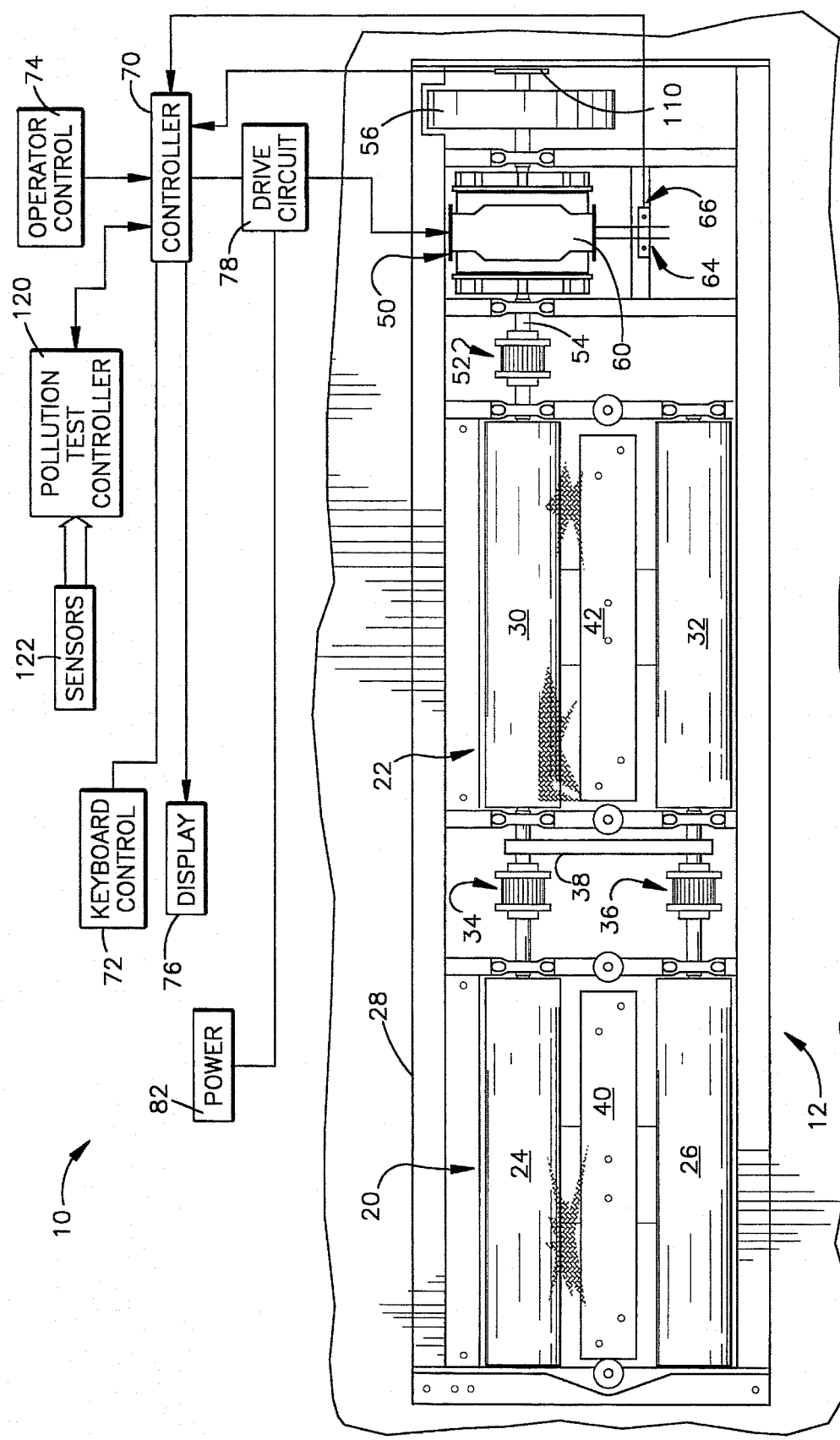
FIG. 2 is a schematic diagram of the dynamometer system of FIG. 1 showing the test stand and control electronics in further details.

Referring to FIGS. 1 and 2, a dynamometer system 10, in accordance with the present invention, includes a test stand assembly 12 onto which a vehicle 14 to be tested is driven. Specifically, the drivable wheels 16, 18 of the front wheel drive vehicle 14 are driven onto roller pairs 20, 22, respectively. Roller pair 20 includes spaced apart rollers 24 and 26 rotatably mounted to a test stand frame 28 in a known manner. Roller pair 22 includes spaced apart rollers 30, 32 rotatably mounted to test stand 28. Rollers 24 and 30 are drivably coupled together through drive coupling 34. Rollers 26 and 32 are drivably coupled together through drive coupling 36. Rollers 24, 30 are drivably coupled to rollers 26, 32 through a belt connection 38 in a known manner.

The test stand assembly 12 further includes a first wheel lift 40 operative between rollers 24, 26, and a second wheel lift 42 operative between rollers 30, 32. The wheel lifts 40, 42 are moveable up and down relative to the roller pairs 20, 22, respectively, to aid in the entrance and exit of the vehicle from the test stand assembly 12 in a manner well known in the art.

The roller pairs 20, 22 are operatively coupled to an electrically actuatable force producing device 50 through a drive coupling 52 and shaft 54. The force producing device is mounted to the test stand 28. In accordance with one embodiment of the present invention, the force producing device is an electrically actuatable braking device, such as an eddy current brake. Other forms of braking or braking/motoring devices may be used.

When the brake 50 is not energized, roller pairs 20, 22 may rotate substantially uninhibited by the braking device 50. When the brake 50 is energized, resistance to rotation of the roller pairs 20, 22 increases by an amount functionally related to the voltage applied to the brake 50. The shaft 54 is a through shaft that extends through the braking device 50. A flywheel 56 is connected to the shaft 54 and provides a fixed inertia load to rotation of the roller pairs 20, 22.

A housing 60 of the braking device 50 is rotatably movable about a mounting axis. The mounting arrangement for such a braking device of a dynamometer is known in the art. When the test vehicle 14 drives the roller pairs 20, 22 into rotation and the brake 50 is energized, the brake 50 is applying a braking torque to rotation of the roller pairs 20, 22 through the shaft 54. The amount of rotational movement of housing 60 is functionally related to the amount of the braking torque applied by the braking device 50.

A load sensor 64 is operatively coupled between the braking device 50 and the frame 28. The load sensor measures the amount of the braking torque applied by the braking device and outputs an electric signal 66 having a value indicative of the applied torque. Of course, those skilled in the art appreciate that the braking torque is effective only when a vehicle is driving the roller pairs 20, 22. If the force producing device 50 is a motor instead of a brake, torque could be applied when the device 50 is energized. In accordance with a preferred embodiment of the present invention, the load sensor 64 is mounted one foot from the mounting axis of the brake 50 so that the output of the load sensor is directly indicative of torque in foot-pounds ("ft-lbs").

A controller 70 is electrically connected to the load sensor 64 and monitors the applied braking torque. An external keyboard 72 is operatively connected to the controller 70. An operator control box 74 may also be connected to the controller 70. The connection wires for connecting the operator control box 74 to the controller 70 are sufficiently long to permit the control box to be placed inside of the vehicle occupant compartment during testing of the vehicle. The control box 74 could also communicate with controller 70 using infrared, EMF, etc., remote control technology.

The controller 70 is connected to a display device 76. The display 76 is place on a table 80 or cart. The height of the table 80 and location of the table relative to the test stand 28 are such that the vehicle operator can easily see the display 76 during a vehicle test when the vehicle is on the dynamometer test stand 12. The controller 70 is connected to the braking device 50 through a drive circuit 78. The drive circuit 78 is connected to a source of electrical energy 82. A rotation speed sensor 110 is operatively connected to the through shaft 54 and provides an electric signal to the controller 70 indicative of the rotational speed of the roller pairs 20, 22 in revolutions per minute or, if properly scaled, in miles per hour.

If the dynamometer is used for pollution testing of the vehicle, the controller 70 is connected to a pollution test controller 120. The pollution test controller 120 is connected to a plurality of pollution monitoring sensors 122 as is well known in the art. Those skilled in the art will appreciate that the functions of the two controllers 70, 120, could be combined into a single control unit.

In accordance with the present invention, a total braking force, designated $\Gamma_{TDAF}$ (total dynamometer applied force), applied to a test vehicle 14 from the dynamometer 10 to achieve road load simulation can be expressed as:

$$\Gamma_{TDAF} = \Gamma_{TRLF} - \Gamma_{PLF} + \Gamma_{IS} - \Gamma_{GTRL} \quad (1)$$

where $\Gamma_{TRLF}$ is a value of track road load force, $\Gamma_{PLF}$ is a value indicative of parasitic loss force, $\Gamma_{IS}$ is an inertia simulation force determined in accordance with the present invention, and $\Gamma_{GTRL}$ is the general tire rolling interface losses. The track road load force value $\Gamma_{TRLF}$ and the parasitic loss force value $\Gamma_{PLF}$ are determined in response to measured vehicle speed. The inertia simulation force $\Gamma_{IS}$ is acceleration dependent and may be determined from a velocity versus time look-up table. The general tire rolling interface losses $\Gamma_{GTRL}$ is also velocity dependent. Other velocity or static (e.g., road slope, vehicle weight) dependent variables may be considered in the determination of the total force value. The brake device 50 is controlled in response to the determined total force value $\Gamma_{TDAF}$.

The value of track road load force $\Gamma_{TRLF}$ is a force value that the test vehicle would experience while driving on a flat road. This track road load force can be expressed as:

$$\Gamma_{TRLF} = \frac{((A_v \times Ob_{mph}) + (B_v \times Ob_{mph}^2) + (C_v \times Ob_{mph}^3)) \times 5252}{V_{rpm}} \quad (2)$$

where the track road load force $\Gamma_{TRLF}$ is in foot-pounds (ft-lb); $A_v$ is a value indicative of constant speed losses due to vehicle friction items such as bearings, seals, lubricants, and gear mesh; $B_v$ are speed dependent vehicle related parameters such as tire-to-road interface, seals, bearings, lubricants, and gear mesh; and $C_v$ are losses attributable to air/wind effects including vehicle frontal and protrusion areas, vehicle dynamics, ground effects, vehicle drag coefficient, and air density. Air density factors include effects resulting from humidity, temperature, and barometric pressure. $Ob_{mph}$ is the value of observed or measured vehicle speed.

Each of the Terms $A_v$, $B_v$, and $C_v$ are functionally related to track road load horsepower of the test vehicle at 50 mph. This horsepower value is assigned to a vehicle class during new car certification or is specified in accordance with a vehicle class by a test agency, such as the environment protection agency ("EPA"). This horsepower value is indicative of the power a vehicle needs to generate to hold a constant speed of 50 mph on a flat road. This value is empirically determined by vehicle track coast down testing or calculated by vehicle frontal area. Calculation of a horsepower value in response to vehicle frontal area is fully described in 40 CFR §86 which is hereby fully incorporated herein by reference. Also, the determination of the each of the Terms $A_v$, $B_v$, and $C_v$ which are functionally related to track road load horsepower is described in detail in a United States Environmental Protection Agency document entitled "HIGH-TECH I/M TEST PROCEDURES, EMISSION STANDARDS, QUALITY CONTROL REQUIREMENTS, AND EQUIPMENT SPECIFICATIONS" which is hereby fully incorporated herein by reference. In particular, §85.2226(a)(2)(i) of this EPA publication indicates that these terms are determined in accordance with the following:

$$A_v = \left(\frac{0.35}{50}\right) \times (TRLHP \text{ at 50 mph}) \text{ hp/mph} \tag{3}$$

$$B_v = \left(\frac{0.10}{2500}\right) \times (TRLHP \text{ at 50 mph}) \text{ hp/mph}^2 \tag{4}$$

$$C_v = \left(\frac{0.55}{125000}\right) \times (TRLHP \text{ at 50 mph}) \text{ hp/mph}^3 \tag{5}$$

where TRLHP is the track road load horsepower.

The term $V_{rpm}$ in equation (2) above is the rpm of the dynamometer rolls at the observed mph ($Ob_{mph}$). The value of $V_{rpm}$ is determined in accordance with:

$$V_{rpm} = \frac{5280 \text{ ft/mile} \times 12 \text{ inches/ft} \times Ob_{mph} \text{ mph}}{\text{Roll Diameter (inches)} \times \pi \times 60 \text{ min/hr}} \tag{6}$$

The parasitic loss forces $\Gamma_{PLF}$ are those forces associated with a dynamometer that are not measured with the torque measuring device 64. These forces are imposed on the test vehicle as a load applied by the dynamometer. The parasitic loss force $\Gamma_{PLF}$ value can be obtained from a look-up table of $\Gamma_{PLF}$ values vs. speed or can be determined from:

$$\Gamma_{PLF} = A_p + (B_p \times Ob_{mph}) + (C_p \times Ob^2_{mph}) \tag{7}$$

where $A_p$ are static friction losses of the dynamometer due to bearings, seals, belts, and lubricants; $B_p$ are friction losses of the dynamometer at speed due to bearings, seals, belts, and lubricants; and $C_p$ are dynamic friction losses based on air and wind losses of the dynamometer resulting from rollers spinning, inertia weights, spinning belts, and power train components. The term $O_{mph}$ is, again, the observed or measured mph of the test vehicle.

To better understand the inertia simulation force $\Gamma_{IS}$, first consider the vehicle inertia force $\Gamma_{VI}$ of the test vehicle. The inertia force $\Gamma_{VI}$ of the test vehicle is that force needed to change the velocity of the test vehicle from a first value to a second value within a predetermined time period. The vehicle can be represented as a fixed mass. The inertia force $\Gamma_{VI}$ of the test vehicle can be represented as:

$$\Gamma_{VI} = \frac{\frac{0.5 \times ETW}{32.17406} \times (V_2^2 - V_1^2) \times 5252}{550 \times ET \times AVV_{rpm}} \tag{8}$$

where ETW is the vehicle test weight in predetermined increments, $V_1$ is the initial velocity of the test vehicle in ft/sec, $V_2$ is the final velocity of the vehicle in ft/sec, ET is the elapsed time for vehicle to change from the initial to the final velocity in seconds, and $AVV_{rpm}$ is the rpm's of the dynamometer rollers at the averaged observed or measured vehicle speed of $V_1$ and $V_2$ determined by:

$$AVV_{rpm} = \frac{V_{2_{rpm}} + V_{1_{rpm}}}{2} \tag{9}$$

The inertia simulation force $\Gamma_{IS}$ of the test vehicle can be represented as:

$$\Gamma_{IS} = \frac{\frac{0.5 \times (ETW - DBI)}{32.17406} \times (V_2^2 - V_1^2) \times 5252}{550 \times ET \times AVV_{rpm}} \tag{10}$$

where ETW is the vehicle test weight in predetermined increments, and DBI is the dynamometer base inertia, i.e., the total inertia of the rotating components of the dynamometer. A portion of this load is attributable to the dynamometer fly-wheel 56. A typical DBI of the dynamometer is 2000 lbs. $V_1$ is the initial velocity of the test vehicle in ft/sec, $V_2$ is the final velocity of the vehicle in ft/sec, ET is the amount of time needed for vehicle to change from the initial to the final velocity in seconds, and $AVV_{rpm}$ is the average rpm's of $V_1$ and $V_2$ of the dynamometer rollers at the average observed or measured vehicle speed.

Those skilled in the art will appreciate that the term "vehicle speed" means the speed at which the vehicle would be traveling if it were on a road surface. Of course, while the vehicle has its drive wheels on the dynamometer, its ground speed is zero even though driven wheels are rotating. In prior art inertia simulation systems, the value of vehicle speed is measured and then a load value is adjusted. In accordance with the present invention, the velocity values of the vehicle are known in advance thereby permitting loads to be adjusted as they occur instead of after they occur.

Figure 3:
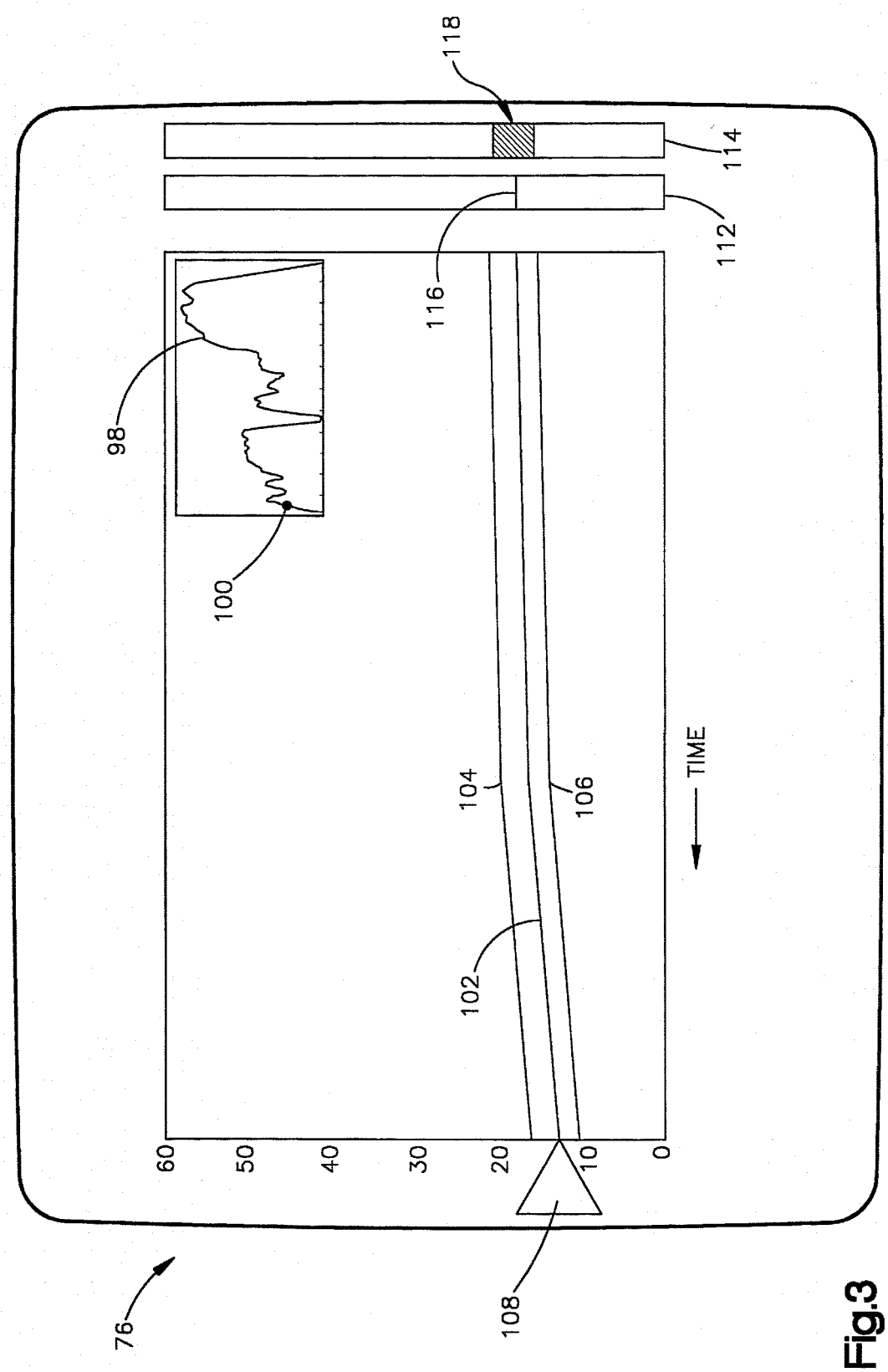
FIG. 3 is a graphical diagram of a speed versus time trace shown on the display of FIG. 1 during a vehicle test.

To accomplish this simulation control, desired velocity values versus time graph 98, shown in FIG. 3, is displayed in the upper right-hand corner of the display monitor 76. In accordance with a preferred embodiment of the present invention, velocity values are displayed on the Y-axis and time is displayed on the X-axis. Those skilled in the art will appreciate that the axes may be switch so that velocity values are displayed on the X-axis and time is displayed on the Y-axis. These values are preferably stored in the controller 70 in either a look-up table or a data table.

A cursor 100 is associated with the graph 98. The cursor 100 is controlled by the controller 70 so that, when the test is begun by the operator providing such an indication through the keyboard 72 or external control 74, the cursor 100 moves along the graph line 98 as a function of time. Rather than a cursor, the graph line 98 may be colored two different colors. As the test time proceeds, the graph line changes color left to right as a function of time with the color interface indicating the time progress of the test.

To test the vehicle, a test stand operator either through the keyboard 72 or operator control box 74, indicates that the test is beginning. The controller then displays on the main portion of the display monitor 76 a desired vehicle speed 102 as a function of time. The desired vehicle speed 102 is bordered by an upper speed limit 104 and a lower speed limit 106. A vehicle speed indicator 108 displays the present vehicle speed as determined by an RPM sensor 110 connected to the shaft 54 and to the controller 70. The controller calculates vehicle speed from the RPM sensor 110. Alternatively, the sensor 110 can be selected to provide a signal directly indicative of vehicle speed.

The vehicle operator is to control the accelerator pedal in the vehicle so that the indicator 108 (measured vehicle speed) stays between the upper and lower limits 104, 106, respectively. In this way, the measured vehicle speed will be equal to the desired vehicle speed.

Preferably, the display 76 dynamically displays the desired vehicle speed 102, the upper speed limit 104, and the bottom speed limit 106 so that the three lines appear to be moving toward the Y-axis as a function of time. The time scale on the X-axis is substantially expanded as compared with the time scale of the graph displayed in the upper right hand corner of the display 76. If the time scales of the two graphs were the same, the graph line 102 and the graph line 98 would be identical. As time progresses, lines 102, 104, and 106 move up and down the Y-axis commensurate with the values displayed in graph 98.

The speed indicator 108 is moved up and down by the vehicle operator controlling the vehicle accelerator peddle. The vehicle operator must keep the indicator 108 between the upper speed limit 104 and the lower speed limit 106. If the indicator is permitted to go outside of the window defined by the limits 104, 106, longer than a predetermined time, the controller 70 will provide an indication to controller 120 that a test failure has occurred and the test will have to be restarted. Preferably, when the speed is out of the window, there is a two second time limit before the system records an error. The controller 70 may also display a failure indication on display 76.

As mentioned, the value of the preferred speed 102 is equal to the value of the graph line 98 displayed in the upper right hand corner of the display 76. The upper speed limit 104 and the lower speed limit 106 are respectively defined as being plus and minus 2 mph of the velocity values within plus and minus 1 second of the then present desired speed value. Therefore, if the desired vehicle speed 102 is flat over time, the limits will be close to the plus and minus 2 mph value. If the desired vehicle speed 102 is substantially changing as a function of time, the limit differential will be increased from the plus and minus 2 mph value.

Alternatively, bar graphs 112 and 114 can be used to display a measured vehicle speed value 116 and a desired speed window 118. The vehicle operator will control the vehicle accelerometer peddle to keep the indicator 116 between the area defined by the window 118. The window 118 will move up and down its scale vertically as a function of time. The width of the window will also vary over time as discussed above.

The controller 70 controls the braking device 50, through the drive circuit 78, to apply velocity dependent loads in accordance with equation (1) above. Since the controller 70 "knows" what the vehicle speed is at the present and what the vehicle speed will be in the future, the controller anticipates changes in vehicle speed. Therefore, loads are applied simultaneously with the occurrence of vehicle speed changes. The inertia simulation force term $\Gamma_{IS}$s, derived above, uses two variables $V_1$ and $V_2$ to simulate inertia. Since the present invention provides a way to know $V_1$ and $V_2$ in advance, no delay is experienced for load application.

The present invention has been describe with the force producing device being an eddy current brake. Of course, the use of other types of braking device other than an eddy current brake may be used. Also, it is contemplated that the force producing device may be a motor. Furthermore, the invention may be used for applying a load to an engine directly, i.e., an engine dynamometer, and is not limited to a vehicle test stand arrangement.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for establishing virtual inertia in a dynamometer, said apparatus comprising:

actuatable force producing means for, when actuated, applying a controllable amount of force to a device under test;

display means for displaying predetermined velocity values versus time graph;

means for monitoring velocity of said device under test; and control means for comparatively displaying on said display means said monitored velocity value of said device under test against the predetermined velocity value and for controlling said actuatable force producing means to simulate inertia loads in accordance with said displayed predetermined velocity values.

2. The apparatus of claim 1 wherein said control means includes means for anticipating a vehicle acceleration value in response to said predetermined desired velocity values.

3. The apparatus of claim 2 wherein said predetermined desired velocity values are stored in a memory.

4. The apparatus of claim 1 wherein said display means for displaying predetermined desired velocity values versus time graph further includes displaying an upper velocity threshold value greater than said predetermined desired velocity value and a lower velocity threshold value less than said predetermined desired velocity value, said control means providing an indication when said monitored velocity value is not within said upper velocity threshold value and said lower velocity threshold value.

5. The apparatus of claim 4 wherein said control means further includes means for determining said upper velocity threshold value and said lower velocity threshold value respectively equal to plus and minus a predetermined amount within plus and minus a predetermined time period from said desired threshold value.

6. The apparatus of claim 1 wherein said force producing means is an eddy current braking device.

7. An apparatus for establishing virtual inertia in a dynamometer having at least one roller mounted in a frame for engagement with at least one driven wheel of a vehicle, said apparatus comprising:

actuatable force producing means for, when actuated, applying a controllable amount of force to said at least one roller of said dynamometer;

display means for displaying predetermined desired velocity values versus time graph;

means for monitoring vehicle speed; and control means for comparatively displaying on said display means said monitored vehicle speed against the predetermined desired velocity value and for controlling said actuatable force producing means to simulate inertia loads in accordance with said displayed predetermined desired velocity values.

8. The apparatus of claim 7 wherein said control means controls said force producing means to apply an inertia load in accordance with:

$$\Gamma_{TDAF} = \Gamma_{TRLF} - \Gamma_{PLF} + \Gamma_{IS} - \Gamma_{GTRL}$$

where $\Gamma_{TRLF}$ is a value of track road load force, $\Gamma_{PLF}$ is a value indicative of parasitic loss force, $\Gamma_{GTRL}$ is the general tire roll interface losses, and $\Gamma_{IS}$ is an inertia simulation force responsive to said displayed predetermined desired velocity values.

9. The apparatus of claim 7 wherein said force producing means is an eddy current braking device operatively connected between said roller and a fixed test stand.

10. The apparatus of claim 7 wherein said predetermined desired velocity values are stored in a look-up table.

11. A method for establishing virtual inertia in a dynamometer, said method comprising the steps of:

applying a controllable amount of force to a device under test in response to a control signal;

displaying predetermined desired velocity values versus time graph for said device under test;

monitoring actual velocity of said device under test; and comparatively displaying the monitored velocity of said device under test against the predetermined desired velocity value of said device under test;

providing said control signal to control said applied force and thereby simulate inertia loads in accordance with said displayed predetermined desired velocity value of said device under test.

12. The method of claim 11 wherein said step of providing a control signal includes the step of anticipating a vehicle acceleration value in response to said predetermined desired velocity values.

13. The method of claim 11 wherein said step of displaying includes the steps of displaying an upper velocity threshold value greater than said predetermined desired velocity value and a lower velocity threshold value less than said predetermined desired velocity value, and wherein said method further includes the step of providing an indication when said monitored velocity value is not within said upper velocity threshold value and said lower velocity threshold value.

14. A method for establishing virtual inertia in a dynamometer having at least one roller mounted in a frame for engagement with at least one driven wheel of a vehicle, said method comprising the steps of:

applying a controllable amount of force to said at least one roller of said dynamometer in response to a control signal;

displaying a predetermined desired velocity values versus time graph;

monitoring vehicle speed; and comparatively displaying the monitored vehicle speed against the predetermined desired velocity value;

providing said control signal to control said force and thereby simulate inertia loads in accordance with said displayed predetermined desired velocity values.

15. The method of claim 14 wherein said step of providing said control signal includes providing said control signal in accordance with:

$$\Gamma_{TDAF} = \Gamma_{TRLF} - \Gamma_{PLF} + \Gamma_{IS} - \Gamma_{GTRL}$$

where $\Gamma_{TRLF}$ is a value of track road load force, $\Gamma_{PLF}$ is a value indicative of parasitic loss force, $\Gamma_{GTRL}$ is the general tire roll interface losses, and $\Gamma_{IS}$ is an inertia simulation force responsive to said displayed predetermined desired velocity values.

16. An apparatus for establishing virtual inertia in a dynamometer having at least one roller mounted in a frame for engagement with at least one driven wheel of a vehicle, said apparatus comprising:

actuatable force producing means for, when actuated, applying a controllable amount of force to said at least one roller of said dynamometer;

display means for displaying desired velocity values versus time graph;

means for monitoring vehicle speed; and control means for comparatively displaying on said display means said monitored vehicle speed against the desired velocity value and for controlling said actuatable force producing means to simulate inertia loads in accordance with said displayed desired velocity values, said control means applying an inertia load in accordance with:

$$\Gamma_{TDAF} = \Gamma_{TRLF} - \Gamma_{PLF} + \Gamma_{IS} - \Gamma_{GTRL}$$

where $\Gamma_{TRLF}$ is a value of track road load force, $\Gamma_{PLF}$ is a value indicative of parasitic loss force, $\Gamma_{GTRL}$ is the general tire roll interface losses, and $\Gamma_{IS}$ is an inertia simulation force determined in accordance with:

$$\Gamma_{IS} = \frac{\frac{0.5 \times (ETW - DBI)}{32.17406} \times (V_2^2 - V_1^2) \times 5252}{550 \times ET \times AVV_{rpm}}$$

where ETW is the vehicle test weight, DBI is a dynamometer equivalent inertia load, $V_1$ is an initial velocity of the test vehicle in ft/sec, $V_2$ is a final velocity of the vehicle in ft/sec, ET is an amount of time needed for the vehicle to change from the initial to the final velocity in seconds, and $AVV_{rpm}$ is the average value of the rpm's of the dynamometer rollers at the measured vehicle speed determined by $$AVV_{rpm} = \frac{V_{1_{rpm}} + V_{2_{rpm}}}{2}.$$

17. A method for establishing virtual inertia in a dynamometer having at least one roller mounted in a frame for engagement with at least one driven wheel of a vehicle, said method comprising the steps of:

applying a controllable amount of force to said at least one roller of said dynamometer in response to a control signal;

displaying a desired velocity values versus time graph;

monitoring vehicle speed;

comparatively displaying the monitored vehicle speed against the desired velocity value; and providing said control signal to control said force and thereby simulate inertia loads in accordance with said displayed desired velocity values, said control signal being provided in accordance with:

$$\Gamma_{TDAF} = \Gamma_{TRLF} - \Gamma_{PLF} + \Gamma_{IS} - \Gamma_{GTRL}$$

where $\Gamma_{TRLF}$ is a value of track road load force, $\Gamma_{PLF}$ is a value indicative of parasitic loss force, $\Gamma_{GTRL}$ is the general tire roll interface losses, and $\Gamma_{IS}$ is an inertia simulation force determined in accordance with:

$$\Gamma_{IS} = \frac{\frac{0.5 \times (ETW - DBI)}{32.17406} \times (V_2^2 - V_1^2) \times 5252}{550 \times ET \times AVV_{rpm}}$$

where ETW is the vehicle test weight, DBI is a dynamometer equivalent inertia load, $V_1$ is an initial velocity of the test vehicle in ft/sec, $V_2$ is a final velocity of the vehicle in ft/sec, ET is an amount of time needed for the vehicle to change from the initial to the final velocity in seconds, and $AVV_{rpm}$ is the average value of the rpm's of the dynamometer rollers at the measured vehicle speed determined by $$AVV_{rpm} = \frac{V_{1_{rpm}} + V_{2_{rpm}}}{2}.$$

* * * * *

UNITED STATES PATENT AND TRADEMARK OFFICE
CERTIFICATE OF CORRECTION

PATENT NO. : 5,531,107
DATED : July 2, 1996
INVENTOR(S) : Donald W. Ganzhorn, Jr.

It is certified that error appears in the above-indentified patent and that said Letters Patent is hereby corrected as shown below:

Column 7, line 61, after "predetermined" insert --desired--.

Column 8, line 1, after "predetermined" insert --desired--.

Column 8, line 4, after "predetermined" insert --desired--.

Signed and Sealed this

Third Day of December, 1996

Attest:

BRUCE LEHMAN

*Attesting Officer*     *Commissioner of Patents and Trademarks*